United States Patent
Bergenlid et al.

(10) Patent No.: US 6,684,075 B2
(45) Date of Patent: *Jan. 27, 2004

(54) MULTIPLE FREQUENCY REALLOCATIONS IN AN AUTOMATED FREQUENCY ALLOCATION ENVIRONMENT

(75) Inventors: Mikael Bergenlid, Sköndal (SE); Matts Sporre, Älta (SE); Anders Rudolphi, Årsta (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,428

(22) Filed: Apr. 16, 1998

(65) Prior Publication Data

US 2001/0041574 A1 Nov. 15, 2001

(51) Int. Cl.[7] .................................................. H04Q 7/20
(52) U.S. Cl. ..................................... 455/447; 455/452.1
(58) Field of Search ................................. 455/447, 450, 455/452, 453, 455, 452.1, 452.2

(56) References Cited

U.S. PATENT DOCUMENTS

| 5,574,974 A | * | 11/1996 | Almgren et al. | 455/450 |
| 5,603,085 A | * | 2/1997 | Shedlo | 455/450 |
| 5,649,292 A | * | 7/1997 | Doner | 455/447 |
| 5,850,608 A | * | 12/1998 | Faruque | 455/447 |
| 5,884,145 A | * | 3/1999 | Haartsen | 455/63 |
| 5,901,356 A | * | 5/1999 | Hudson | 455/451 |
| 5,903,842 A | * | 5/1999 | Wang et al. | 455/450 X |
| 6,223,041 B1 | * | 4/2001 | Egner et al. | 455/452 |

FOREIGN PATENT DOCUMENTS

| EP | 0 571 133 A | 11/1993 |
| GB | 2 308 789 A | 7/1997 |
| WO | WO 92 21182 A | 11/1992 |
| WO | WO 96 12369 A | 4/1996 |
| WO | PCT/SE99/00581 | 8/1999 |

* cited by examiner

Primary Examiner—Nay Maung
Assistant Examiner—Philip J. Sobutka

(57) ABSTRACT

A method and system are disclosed for making multiple frequency reallocation decisions, which can be based on a single set of radio channel measurements. A consideration area (CA) is defined for each cell in a set of cells being optimized for a frequency plan. For example, a CA for a cell can be defined in terms of a distance between cells, radio attenuation between cells, and/or a handover order for neighboring cells (e.g., all 2nd order or neighbors' neighboring cells). For the preferred embodiment, a frequency or channel reallocation made in a cell may not be detected outside of that particular cell's CA. As such, the frequency plan can be optimized by determining all reallocations whereby local allocation-beneficial suggestions are found. For example, if a cell's CA is defined as its 1st order neighbors, these beneficial suggestions can be consistency determinations (e.g., set of rules) that apply to that cell and its contiguous (1st order) neighbors.

39 Claims, 4 Drawing Sheets

MULTIPLE FREQUENCY REALLOCATIONS IN AN AUTOMATED FREQUENCY ALLOCATION ENVIRONMENT

BACKGROUND OF THE INVENTION

1. Technical Field of the Invention

The present invention relates in general to the cellular communications field and, in particular, to a method and system for reallocating multiple channels in an Automatic Frequency Allocation (AFA) environment.

2. Description of Related Art

In order to obtain reliable statistics while using an automatic process to improve frequency allocations in a cellular communications network based on signal strength measurements (e.g., AFA), an important objective is to conduct the measurements over a relatively long period of time. As such, in order to reduce the time needed to improve such a network's frequency plan, another important objective is to make more than one frequency reallocation per measurement period. However, a solution to meeting this objective is not a trivial one, because, for example, the measurement results may suggest allocating the same frequency in two relatively near or contiguous cells. If the measurement process being used determines there are two "bad" frequencies in two neighboring cells, typically the automated frequency allocation process (e.g., AFA) will suggest that the two frequencies be replaced by one and the same "good" frequency. However, this approach is problematic, because the two neighboring cells may interfere with each other to a great extent after the reallocation occurs. Consequently, the problem of determining how to make more than one frequency reallocation per measurement period still exists for the conventional automated frequency allocation technologies.

In general, a number of measurement-based automatic frequency planning solutions exist in the prior art. These solutions are typically based on an approach that obtains local measurement information to make decentralized reallocation decisions. In other words, these solutions may leave the radio environment improved for one cell, but can still be deteriorated for another cell.

Also, another shortcoming of the existing automated frequency planning approaches is that the signal quality in different parts of a cellular network can fluctuate, sometimes very widely. Consequently, a decision for two cells relatively close to each other may be to change them to the same channel, which can result in high (possibly higher than before) interference levels, even after the frequency reallocations have occurred. However, as described in detail below, the present invention successfully resolves these problems.

SUMMARY OF THE INVENTION

In accordance with a preferred embodiment of the present invention, a method and system are provided for making multiple frequency reallocation decisions, which can be based on a single set of radio channel measurements. A consideration area (CA) is defined for each cell in a set of cells being optimized for a frequency plan. For example, a CA for a cell can be defined in terms of a distance between cells, radio attenuation between cells, and/or a handover order for neighboring cells (e.g., all 2nd order or neighbors' neighboring cells). For the preferred embodiment, a frequency or channel reallocation made in a cell may not be detected outside of that particular cell's CA. As such, the frequency plan can be optimized by determining all reallocations whereby local allocation-beneficial suggestions are found. For example, if a cell's CA is defined as its 1st order neighbors, these beneficial suggestions can be consistency determinations (e.g., set of rules) that apply to that cell and its contiguous (1st order) neighbors.

An important technical advantage of the present invention is that new frequency or channel reallocations do not require that additional radio channel measurements be made.

Another important technical advantage of the present invention is that it is possible for an automatic frequency allocation algorithm to make numerous frequency or channel reallocations while still monitoring the quality improvement and/or impairment of neighboring cells.

Still another important technical advantage of the present invention is that a CA for cells can be defined, which can be used to increase the number of frequency or channel reallocations made per radio channel measurement period.

Yet another important technical advantage of the present invention is that a CA for cells can be defined, which can be used to decrease the number of frequency or channel reallocations made per radio channel measurement period, in order to increase the reliability of the resulting reallocations.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
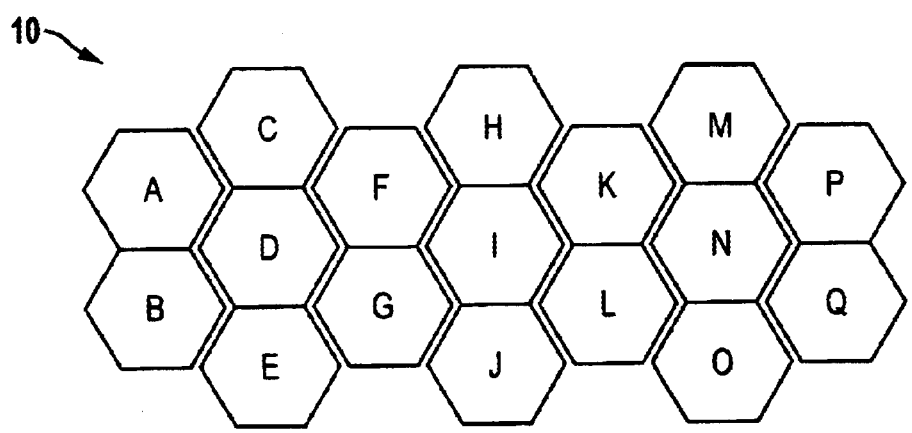
FIG. 1 is a simplified block diagram that illustrates a use of consistency checks for making multiple frequency or channel reallocations per radio channel measurement period in a cellular communications network, in accordance with a preferred embodiment of the present invention.
Figure 2A:
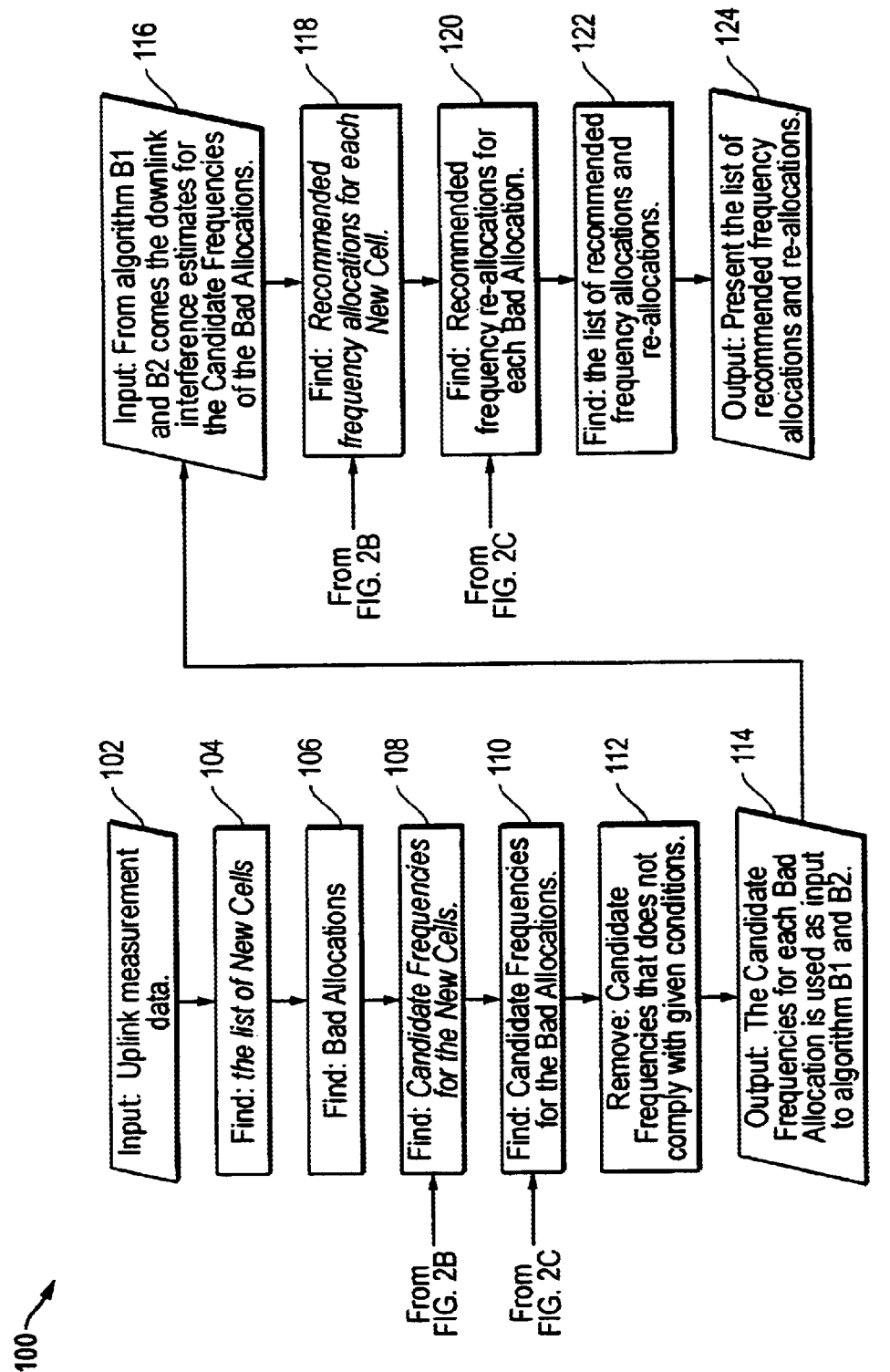
FIG. 2A is a flow diagram that illustrates an overall method used by an automated frequency allocation process, which includes finding both "bad" and "good" allocations in a cellular network.
Figure 2B:
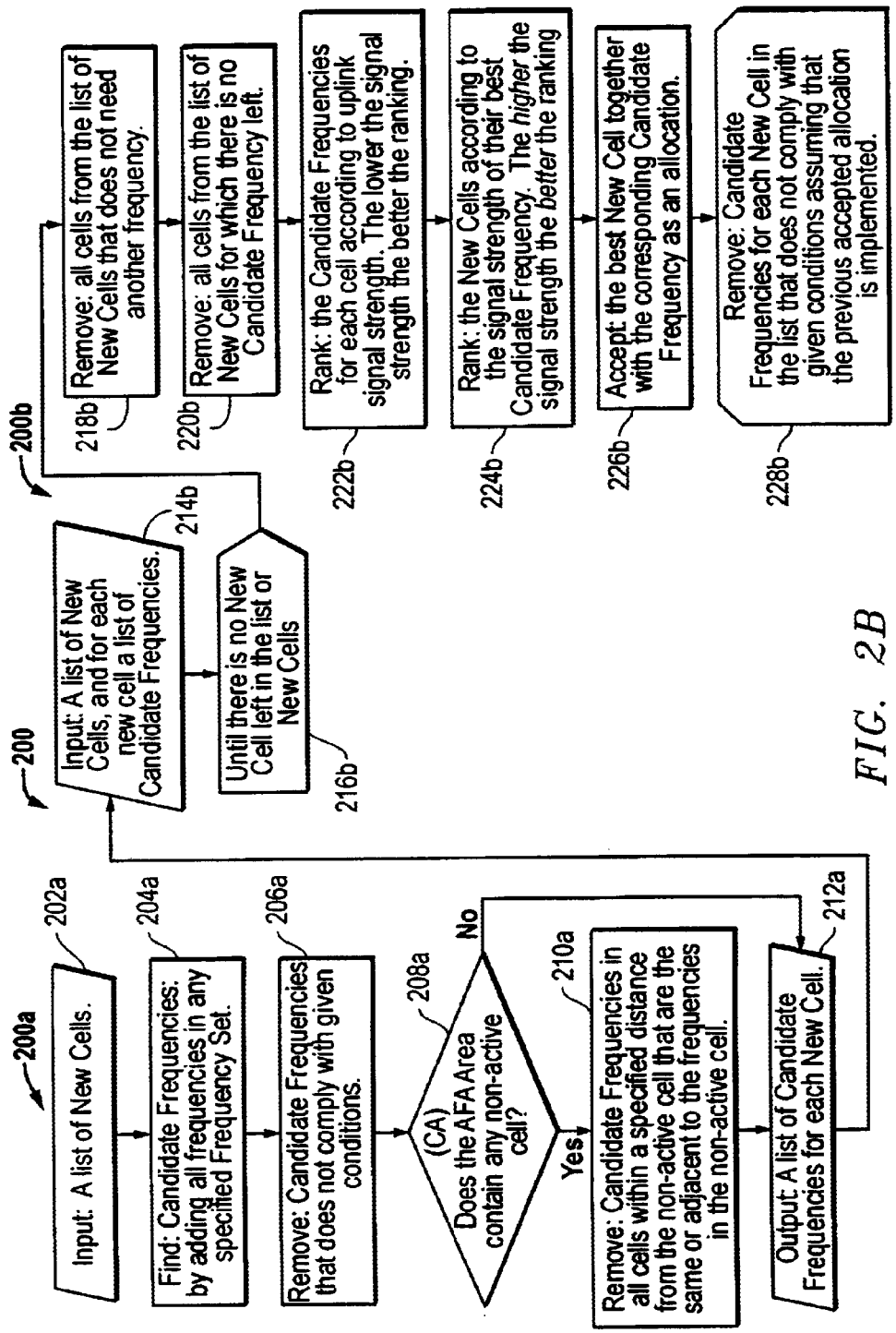
FIG. 2B is a flow diagram that illustrates a method for determining candidate frequencies or channels and recommending frequency allocations for new cells in a cellular network, in accordance with a second embodiment of the present invention.
Figure 2C:
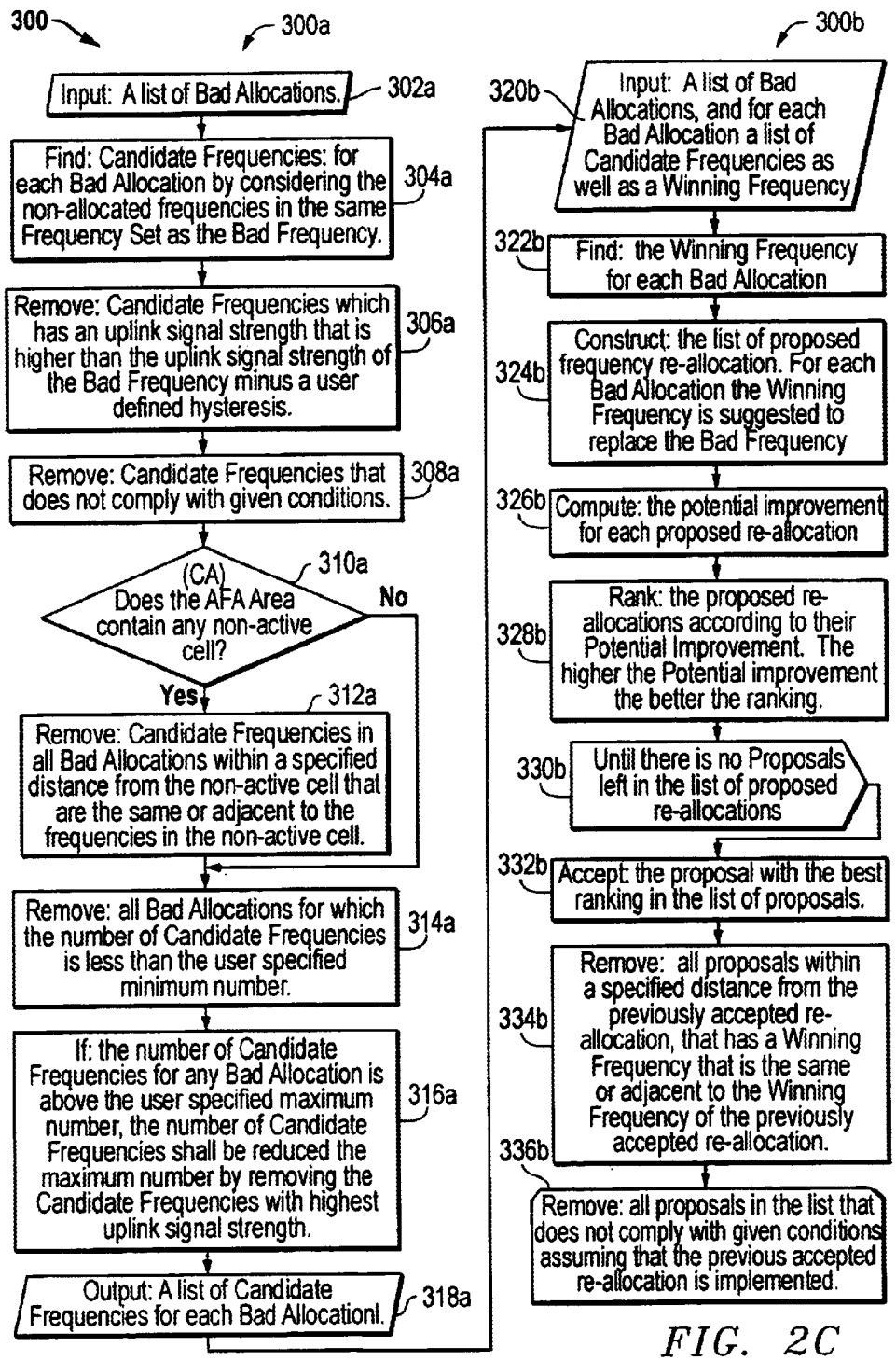
FIG. 2C is a flow diagram that illustrates a method for determining candidate frequencies or channels for bad allocations and recommending frequency allocations for each bad allocation in a cellular network, in accordance with the second embodiment of the present invention.

The preferred embodiment of the present invention and its advantages are best understood by referring to FIGS. 1–2C of the drawings, like numerals being used for like and corresponding parts of the various drawings.

Essentially, in accordance with a preferred embodiment of the present invention, a method and system are provided for making multiple frequency reallocation decisions, which can be based on a single set of radio channel measurements. A CA is defined for each cell in a set of cells being optimized for a frequency plan. For example, a cell's CA can be defined in terms of a distance between cells, radio attenuation between cells, and/or a handover order for neighboring cells (e.g., all 2nd order or neighbors' neighboring cells). For the preferred embodiment, a frequency or channel reallocation made in a cell may not be detected outside of that particular cell's CA. As such, the frequency plan can be optimized by determining all reallocations whereby local allocation-beneficial suggestions are found.

For example, the present invention provides a method for accepting such beneficial suggestions, by first identifying a frequency or channel reallocation suggestion for a cell (e.g., suggested to an automated allocation process by a set of radio channel measurement results) that complies with certain consistency checks (described below) deemed the most beneficial. The second step is for the automated process to accept the most beneficial reallocation obtained in the first step. The third step (repeated until there are no additional beneficial suggestions to be considered) is for the automated process to identify the "best" beneficial suggestion not yet accepted, which complies with the consistency checks (albeit given that the previously accepted suggestions are or have been implemented). Again, for each iteration, the frequency or channel reallocation being proposed or suggested may not include a frequency or channel from a previously accepted suggestion within the CA for the cell involved.

In accordance with the preferred embodiment of the present invention, and as described above, the allocation-beneficial suggestions can be certain consistency checks. For example, if a cell's CA is defined as its kth (e.g., 1st) order neighbors, the consistency checks can be a set of complementary rules that apply to that cell and its kth (e.g., contiguous or 1st) order neighbors. These rules can be defined, for example, in terms of the particular hardware or software (algorithm) being used, and/or they can be based on other considerations. Examples of such rules are: (1) A cell can be prohibited from using any channels used in any neighboring cell; or (2) A transceiver unit can be prohibited from using any channels that are not separated by a minimum bandwidth (e.g., separated by at least "X" kHz)

FIG. 1 is a simplified block diagram that illustrates a use of consistency checks for making multiple frequency or channel reallocations per radio channel measurement period in a cellular communications network, in accordance with a preferred embodiment of the present invention. For this exemplary embodiment, assume that the set of cells, A–Q, in cellular network 10 are all subject to frequency or channel allocation by an automated frequency-planning algorithm (e.g., AFA). If a CA for these cells is defined as the 1st order neighbors, then, for example, that CA for cell "I" includes cell I and its neighbors, cells F, G, H, J, K and L. Consequently, if a reallocation is suggested (e.g., based on a set of radio channel measurements) in cell I, any pending suggestion in cell F, G, H, J, K or L may not include a channel (or frequency) suggested for cell I. However, the present invention provides additional flexibility, by allowing a channel involved in a frequency or channel change with respect to cell I (in the CA of cell I), to still be involved in another frequency or channel reallocation decision for a cell outside of the CA for cell I.

Furthermore, in accordance with the preferred embodiment, any pending suggestion preferably complies with any consistency check (or rule) as defined. For example, in the CA for cell I, no transceiver unit is allowed to use a channel that is closer than 10 kHz from another channel in use by another transceiver unit. Consequently, as described above in accordance with the present invention, a plurality of frequencies or channels can be reallocated per set of radio channel measurements, by an automated frequency allocation process in a cellular communications network.

FIGS. 2A–2C are related flow diagrams that illustrate a method for reallocating a plurality of frequencies or channels per set of radio link measurements, in accordance with a second embodiment of the present invention. For example, FIG. 2A illustrates an overall method used by an automated frequency allocation process (e.g., an AFA process) which includes finding both "bad" and "good" allocations in a cellular network. At step 102, uplink measurement data (e.g., transmitted from pertinent cellular terminals) are provided as inputs to the automated frequency allocation process 100. At step 104, a list of new cells to be considered for frequency or channel allocation is also provided as an input (e.g., from the cellular network involved). At step 106, the automated process determines (e.g., based on the transmitted measurement information) what "bad" frequency or channel allocations have been made for the new cells (e.g., low carrier-to-interference ratio or C/I, etc.). At step 108, the automated process retrieves a list of candidate frequencies or channels for reallocation to the new cells. As described in detail below, the list of candidate frequencies or channels is provided as an input from a unique algorithm, in accordance with the present invention, such as the algorithm and method illustrated by the flow diagram 200a shown in FIG. 2B.

At step 110, the automated process retrieves a list of candidate frequencies or channels for the "bad" allocations determined at step 106. As described in detail below, the list of candidate frequencies or channels for the "bad" allocations is provided as an input from a second unique algorithm, in accordance with the present invention, such as the algorithm and method illustrated by the flow diagram 300a shown in FIG. 2C. At step 112, the automated process removes any candidate frequencies of channels that do not comply with certain given conditions (e.g., consistency checks, such as minimum distance between cells or minimum spacing between frequencies). At step 114, the automated process provides the candidate frequencies for each "bad" allocation (step 110) as an input to a conventional algorithm used to determine downlink interference estimates for these candidate frequencies. An output from that algorithm is provided as an input to the automated process at step 116.

At step 118, the automated process retrieves a list of recommended frequency or channel allocations for each of the new cells. As described in detail below, the list of recommended frequency or channel allocations is provided as an input from a third algorithm, in accordance with the present invention, such as the algorithm and method illustrated by the flow diagram 200b shown in FIG. 2B.

At step 120, the automated process retrieves a list of recommended frequency or channel reallocations for each of the "bad" allocations determined at step 106. As described in detail below, the list of recommended frequency or channel reallocations for each of the "bad" allocations is provided as an input from a fourth unique algorithm, in accordance with the present invention, such as the algorithm and method illustrated by the flow diagram 300b shown in FIG. 2C.

At step 122, the automated process compiles a complete list of recommended frequency or channel allocations and reallocations, based on the results of steps 118 and 120. At step 124, the automated process provides as an output for use by the cellular network in making allocations and reallocations, the compiled list of recommended frequency or channel allocations and reallocations from step 122.

Referring now to the unique algorithms (methods) 200a and 200b illustrated in FIG. 2B, at step 202a, a list of the new cells is input from the cellular network involved (preferably a similar list as described for step 104 in FIG. 2A). At step 204a (preferably under the control of software executed by a network processor), the algorithm determines candidate frequencies (or channels) for the new cells, preferably by adding in all frequencies in any set specified by the network and/or operator. At step 206a, the algorithm removes from the list of candidate frequencies or channels any candidate that does not comply with certain predefined conditions, such as, for example, less than a threshold C/I.

At step 208a, the present algorithm determines whether any of the cells involved in the automated process is a "nonactive" cell (e.g., not for use)? If so, then at step 210a, the algorithm preferably conducts a consistency check. For example, the algorithm removes from the candidate list all candidate frequencies or channels in all cells within a specified distance from a non-active cell, which are the same as or adjacent to the frequencies or channels in the non-active cell. Otherwise, the algorithm proceeds to step 212a, and outputs an updated list of candidate frequencies or channels for each new cell, as an input to step 108 in FIG. 2A.

A list of the new cells and the updated list of candidate frequencies or channels (from step 212a) is input by a unique algorithm at step 214b. At step 216b, the algorithm initiates an iterative process that preferably concludes when there are no new cells left in the list provided at step 214b. During each such iteration, at step 218b, the algorithm removes all cells from the list of new cells that do not require an allocation of another frequency or channel. At step 220b, the algorithm then removes from the list of new cells, each cell for which there is no candidate frequency or channel remaining. At step 222b, the algorithm ranks the candidate frequencies or channels for each cell, in accordance with the uplink signal strength levels measured. For this exemplary embodiment, the lower the signal strength level, the higher the ranking.

At step 224b, the algorithm ranks the new cells remaining on the list, in accordance with the signal strength level of each of their "best" candidate frequency or channel (from step 222b). For this embodiment, the higher the signal strength level, the higher the ranking.

At step 226b, the algorithm accepts as an allocation the "best" new cell together with the corresponding candidate frequency or channel, using the highest rankings derived from steps 222b and 224b. At step 228b, the algorithm then removes the candidate frequencies or channels for each new cell in the list, which does not comply with predetermined conditions set by the network and/or operator and assuming that the previously accepted allocation (from a previous iteration) has been implemented. As such, in accordance with the present invention, a list of recommended (accepted) frequency or channel allocations is output from step 226b, and input to step 118 in FIG. 2A.

Referring now to the unique algorithms (methods) 300a and 300b illustrated in FIG. 2C, at step 302a, a list of cells that have experienced "bad" allocations is input from the cellular network involved (preferably a similar list as described for step 106 in FIG. 2A). At step 304a (preferably under the control of software executed by a network processor), the algorithm determines candidate frequencies (or channels) for each of the "bad" allocations (from step 302a), by considering the non-allocated frequencies or channels in the same frequency set as a "bad" frequency or channel.

At step 306a, for this exemplary embodiment, the algorithm removes from the list of candidate frequencies or channels, those candidate frequencies or channels that have an uplink signal strength level which is higher than the uplink signal strength level of the "bad" frequency or channel, minus a user-defined hysteresis level. At step 308a, the algorithm then removes from the remaining list those candidate frequencies or channels that do not comply with the predefined network and/or operator conditions.

At step 310a, the algorithm determines whether the cells involved with the automated frequency allocation process include any non-active cells. If so, for this embodiment, at step 312a, the algorithm removes from the list of remaining candidate frequencies or channels, the candidate frequencies or channels in all "bad" allocation cells which are within a specified distance from a non-active cell, and are the same as or adjacent to the frequencies or channels in the non-active cell. Otherwise, the algorithm proceeds to step 314a, and removes from the remaining list all "bad" allocations for which the number of candidate frequencies or channels is less than a user-specified minimum number.

At step 316a, the algorithm determines if the number of candidate frequencies or channels remaining on the list is higher than a user-specified maximum number, and if so, the algorithm reduces the number of candidate frequencies or channels to the maximum number, by removing the candidate frequencies or channels having the highest uplink signal strength levels. At step 318a, the algorithm outputs the (remaining) list of candidate frequencies or channels for each "bad" allocation (list from step 302a) as an input to step 110 in FIG. 2A.

The list of "bad" allocations, as well as a list of candidate frequencies or channels for each such "bad" allocation, and a "winning" frequency or channel for each such "bad" allocation, are input by a unique algorithm at step 320b. At step 322b, the algorithm initiates a process for determining a winning frequency or channel for each "bad" allocation. For this embodiment, at step 324b, the algorithm constructs a list of proposed (by the network and/or operator) frequency reallocations, and for each "bad" allocation listed, the algorithm suggests a winning frequency or channel to replace the "bad" frequency or channel.

At step 326b, the algorithm then calculates the potential improvement deemed for each proposed reallocation (from step 324b). For example, the measured signal strength or C/I levels of a "bad" frequency or channel can be compared with that of a proposed frequency or channel to be reallocated, in order to determine the potential improvement for the proposed frequency or channel reallocation.

At step 328b, the algorithm ranks the proposed reallocation frequencies or channels in accordance with their potential improvements. For this exemplary embodiment, the higher the potential improvement, the higher the ranking. At step 330b, the algorithm initiates an iterative process that is completed when there is no proposal remaining in the list of proposed frequency or channel reallocations. At step 332b, the algorithm accepts the proposal with the highest ranking from the list of proposed frequency or channel reallocations. At step 334b, the algorithm removes from the list of proposals, all proposed frequency or channel reallocations that are within a specified distance from the previously accepted reallocation, and which has a winning frequency that is the same as or adjacent to the winning frequency or channel for the previously accepted reallocation. At step 336b, the algorithm then removes from the list of proposed frequency or channel reallocations, all proposals in the list that do not comply with predefined network and/or operator conditions, assuming that the previously accepted frequency or channel reallocation has been implemented by the network. The algorithm provides the accepted proposals (step 332b) as an input to step 120 in FIG. 2A.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for reallocating a plurality of frequencies based on a single set of radio link measurements in a cellular network, comprising the steps of:

defining a consideration area for a cell in said cellular network, wherein a reallocation made in the cell is not detected in cells outside of the consideration area for the cell;

identifying at least one beneficial reallocation suggestion for said cell, said at least one beneficial reallocation suggestion complying with at least one reallocation rule and being derived from at least one radio link measurement from said single set of radio link measurements, said at least one reallocation rule comprising exclusion of candidate frequencies in all cells in said consideration area within a predefined distance from a non-active cell and including an identical frequency or adjacent frequency to a frequency included in said non-active cell; and accepting said at least one beneficial reallocation suggestion unless said at least one beneficial reallocation suggestion comprises a previously-accepted reallocation suggestion for a second cell, said second cell being included in said consideration area.

2. The method of claim 1, wherein said at least one reallocation rule comprises at least one consistency check.

3. The method of claim 1, wherein said at least one reallocation rule comprises exclusion of a channel used in said second cell.

4. The method of claim 1, wherein said at least one reallocation rule comprises exclusion of a frequency used in said second cell.

5. The method of claim 1, wherein said at least one reallocation rule comprises exclusion of a frequency or channel derived from what is used in a third cell included in said consideration area.

6. The method of claim 1, wherein said at least one reallocation rule comprises a minimum separation between channel frequencies.

7. The method of claim 1, wherein said at least one reallocation rule comprises a minimum separation between cells in said consideration area.

8. A method for reallocating a plurality of frequencies based on a single set of radio link measurements in a cellular network, comprising the steps of:

defining a consideration area for a cell in said cellular network, wherein a reallocation made in the cell is not detected in cells outside of the consideration area for the cell;

identifying at least one beneficial reallocation suggestion for said cell, said at least one beneficial reallocation suggestion complying with at least one reallocation rule and being derived from at least one radio link measurement from said single set of radio link measurements, said at least one reallocation rule comprising exclusion of candidate frequencies in all bad allocation cells in said consideration area within a predefined distance from a non-active cell and includes an identical frequency or adjacent frequency to a frequency included in said non-active cell; and accepting said at least one beneficial reallocation suggestion unless said at least one beneficial reallocation suggestion comprises a previously-accepted reallocation suggestion for a second cell, said second cell being included in said consideration area.

9. The method of claim 8, wherein said at least one reallocation rule comprises at least one consistency check.

10. The method of claim 8, wherein said at least one reallocation rule comprises exclusion of a channel used in said second cell.

11. The method of claim 8, wherein said at least one reallocation rule comprises exclusion of a frequency used in said second cell.

12. The method of claim 8, wherein said at least one reallocation rule comprises exclusion of a frequency or channel derived from what is used in a third cell included in said consideration area.

13. The method of claim 8, wherein said at least one reallocation rule comprises a minimum separation between channel frequencies.

14. The method of claim 8, wherein said at least one reallocation rule comprises a minimum separation between cells in said consideration area.

15. A system for reallocating a plurality of frequencies based on a single set of radio link measurements in a cellular network, comprising:

a consideration area for a cell in said cellular network, wherein a reallocation made in the cell is not detected in cells outside of the consideration area for the cell; and a network processor associated with said consideration area, said network processor operable to:
   define said consideration area;
   identify at least one beneficial reallocation suggestion for said cell, said at least one beneficial reallocation suggestion complying with at least one reallocation rule and being derived from at least one radio link measurement from said single set of radio link measurements, said at least one reallocation rule comprising exclusion of candidate frequencies in all cells in said consideration area within a predefined distance from a non-active cell and including an identical frequency or adjacent frequency to a frequency included in said non-active cell; and
   accept said at least one beneficial reallocation suggestion unless said at least one beneficial reallocation suggestion comprises a previously-accepted reallocation suggestion for a second cell, said second cell being included in said consideration area.

16. The system of claim 15, wherein said at least one reallocation rule comprises at least one consistency check.

17. The system of claim 15, wherein said at least one reallocation rule comprises exclusion of a channel used in said second cell.

18. The system of claim 15, wherein said at least one reallocation rule comprises exclusion of a frequency used in said second cell.

19. The system of claim 15, wherein said at least one reallocation rule comprises exclusion of a frequency or channel derived from what is used in a third cell included in said consideration area.

20. The system of claim 15, wherein said at least one reallocation rule comprises a minimum separation between channel frequencies.

21. The system of claim 15, wherein said at least one reallocation rule comprises a minimum separation between cells in said consideration area.

22. A system for reallocating a plurality of frequencies based on a single set of radio link measurements in a cellular network, comprising:

a consideration area for a cell in said cellular network, wherein a reallocation made in the cell is not detected in cells outside of the consideration area for the cell; and a network processor associated with said consideration area, said network processor operable to:

define said consideration area;

identify at least one beneficial reallocation suggestion for said cell, said at least one beneficial reallocation suggestion complying with at least one reallocation rule and being derived from at least one radio link measurement from said single set of radio link measurements, said at least one reallocation rule comprising exclusion of candidate frequencies in all bad allocation cells in said consideration area within a predefined distance from a non-active cell and including an identical frequency or adjacent frequency to a frequency included in said non-active cell; and accept said at least one beneficial reallocation suggestion unless said at least one beneficial reallocation suggestion comprises a previously-accepted reallocation suggestion for a second cell, said second cell being included in said consideration area.

23. The system of claim 22, wherein said at least one reallocation rule comprises at least one consistency check.

24. The system of claim 22, wherein said at least one reallocation rule comprises exclusion of a channel used in said second cell.

25. The system of claim 22, wherein said at least one reallocation rule comprises exclusion of a frequency used in said second cell.

26. The system of claim 22, wherein said at least one reallocation rule comprises exclusion of a frequency or channel derived from what is used in a third cell included in said consideration area.

27. The system of claim 22, wherein said at least one reallocation rule comprises a minimum separation between channel frequencies.

28. The system of claim 22, wherein said at least one reallocation rule comprises a minimum separation between cells in said consideration area.

29. A method for making multiple frequency reallocating based on a single set of radio link measurements in a cellular network, comprising the steps of:

identifying a plurality of cells for which frequency allocation is desired;

defining a consideration area for each one of said plurality of cells;

identifying a plurality of candidate frequencies for each one of said plurality of cells;

removing candidate frequencies not complying with at least one reallocation rule;

ranking the remaining candidate frequencies according to a predefined criteria; and accepting, based on said ranking, one or more remaining candidate frequencies for each one of said plurality of cells, except no candidate frequency is allocated to more than one cell in a consideration area.

30. The method according to claim 29, wherein said plurality of cells includes new cells and said predefined criteria includes a signal strength of said candidate frequencies.

31. The method according to claim 29, wherein said plurality of cells includes bad allocation cells and said predefined criteria includes a carrier to interference ratio of said candidate frequencies.

32. The method of claim 29, wherein said at least one reallocation rule comprises at least one consistency check.

33. The method of claim 29, wherein said at least one reallocation rule comprises exclusion of a channel used in said second cell.

34. The method of claim 29, wherein said at least one reallocation rule comprises exclusion of a frequency used in said second cell.

35. The method of claim 29, wherein said at least one reallocation rule comprises exclusion of a frequency or channel derived from what is used in a third cell included in said consideration area.

36. The method of claim 29, wherein said at least one reallocation rule comprises a minimum separation between channel frequencies.

37. The method of claim 29, wherein said at least one reallocation rule comprises a minimum separation between cells in said consideration area.

38. The method of claim 29, wherein said reallocation rule comprises exclusion of candidate frequencies in all cells in said consideration area within a predefined distance from a non-active cell and includes an identical frequency or adjacent frequency to a frequency included in said non-active cell.

39. The method of claim 29, wherein said reallocation rule comprises exclusion of candidate frequencies in all bad allocation cells in said consideration area within a predefined distance from a non-active cell and includes an identical frequency or adjacent frequency to a frequency included in said non-active cell.

* * * * *